(12) United States Patent
Stanishevskaya

(10) Patent No.: US 7,100,566 B2
(45) Date of Patent: Sep. 5, 2006

(54) OPERATING METHOD FOR A ROTARY ENGINE AND A ROTARY INTERNAL COMBUSTION ENGINE

(75) Inventor: Elena Anatolyevna Stanishevskaya, Dnepropetrovsk (UA)

(73) Assignee: Domiko Trading Ltd., Nicosia (CY)

( * ) Notice: Subject to any disclaimer, the term of this patent is extended or adjusted under 35 U.S.C. 154(b) by 0 days.

(21) Appl. No.: 10/479,173

(22) PCT Filed: Jan. 31, 2002

(86) PCT No.: PCT/UA02/00007

§ 371 (c)(1),
(2), (4) Date: Apr. 29, 2004

(87) PCT Pub. No.: WO02/097249

PCT Pub. Date: Dec. 5, 2002

(65) Prior Publication Data

US 2004/0168670 A1    Sep. 2, 2004

(30) Foreign Application Priority Data

May 31, 2001  (UA) ................................ 2001053700

(51) Int. Cl.
*F02B 53/04*    (2006.01)
*F02B 53/00*    (2006.01)
*F01C 1/08*     (2006.01)
*F01C 21/00*    (2006.01)

(52) U.S. Cl. ..................... 123/222; 123/228; 123/204; 123/246; 418/196; 418/227; 418/183

(58) Field of Classification Search ................ 123/222, 123/204, 228, 246; 418/227, 196
See application file for complete search history.

(56) References Cited

U.S. PATENT DOCUMENTS

| | | | | | |
|---|---|---|---|---|---|
| 1,003,263 | A | * | 9/1911 | Humphreys | 123/222 |
| 2,466,759 | A | * | 4/1949 | Baylin | 123/246 |
| 2,794,429 | A | * | 6/1957 | Walter | 123/222 |
| 2,870,752 | A | | 1/1959 | Breelle | 123/246 |
| 3,358,652 | A | * | 12/1967 | Lawrence | 123/222 |
| 3,621,820 | A | * | 11/1971 | Newsom | 123/246 |
| 3,724,427 | A | * | 4/1973 | Sauder | 123/204 |
| 3,791,352 | A | * | 2/1974 | Takacs | 123/222 |
| 3,858,559 | A | | 1/1975 | Thomas, Jr. | 123/203 |
| 3,951,111 | A | | 4/1976 | Lester | 123/235 |
| 6,298,821 | B1 | * | 10/2001 | Bolonkin | 123/228 |

FOREIGN PATENT DOCUMENTS

| | | |
|---|---|---|
| FR | 1294417 | 4/1962 |
| FR | 1302333 | 7/1962 |
| FR | 2273947 | 1/1976 |
| FR | 2678683 | 1/1993 |
| RU | 2121065 | 10/1998 |

* cited by examiner

*Primary Examiner*—Thai-Ba Trieu
(74) *Attorney, Agent, or Firm*—Westerman, Hattori, Daniels & Adrian LLP

(57) ABSTRACT

The invention relates to propulsion engineering and particularly to internal-combustion engines. The problem solved by the present invention is improving fuel efficiency and ecological compatibility, as well as providing the ability to set advance ignition at higher rotation, increasing the rotation frequency of the working shaft and decreasing its vibration, thus making the manufacture of such engines more cost effective. This problem is solved by the operational rotor being oval-shaped when viewed in cross-section, whilst the compression rotor being square-shaped when viewed in cross-section.

1 Claim, 5 Drawing Sheets

OPERATING METHOD FOR A ROTARY ENGINE AND A ROTARY INTERNAL COMBUSTION ENGINE

FIELD OF THE INVENTION

The invention relates to propulsion engineering and particularly to methods of operation of rotary internal-combustion engines and their structures.

PRIOR ART

U.S. Pat. No. 3,951,111, F02B 53/08, 1976 discloses a method of operation of a rotary internal-combustion engine comprised of two rotors provided with two sliding blades forming together with flanges of slide valves a charging tank and an engine chamber, characterised in that its operation is based on a four-stroke cycle in which a compressed and ready for ignition combustible mixture is cross-injected between the charging tank of the first cylinder and the engine chamber of the second cylinder after a compression stroke.

A disadvantage of such engine is that injection of compressed combustible mixture from the charging tank to the engine chamber lowers efficiency of the compression stroke. Additionally, inability to set advance ignition at higher rotation results in fuel inefficiency and poor ecological compatibility. This also lowers rotation frequency of an engine working shaft.

The closest prior art for the present invention is constituted by a rotary internal-combustion engine which comprises two cylinders sharing the same axis and including two off-centre rotors with four radial sliding blades each of which has two slots accommodating the ends of stay-spring rods (U.S. Pat. No. 3,858,559, class F02B 53/08, 1975).

This solution is disadvantageous in that unilateral dislocation of a rotor from an axis causes enhanced vibration in an engine due to sliding rotor blades. Furthermore, inability to set advance ignition at higher rotation results in fuel inefficiency and lowering ecological compatibility. This also lowers rotation frequency of the working shaft in an engine.

DISCLOSURE OF THE INVENTION

The problems solved by the present invention are improving fuel efficiency and ecological compatibility of an engine, providing it with the ability to set advance ignition, increasing the rotation frequency of a working shaft and decreasing its vibration, as well as making the manufacturing of such engine more cost effective.

The said problem is solved due to a method of operation of a rotary internal-combustion engine which includes feeding components of combustible mixture in a compression chamber and a working chamber, their compression and ejection to the compression chamber, ignition and combustion of combustible mixture yielding combustion materials further directed in the working chamber, rotation of a rotor connected to a working shaft by combustion materials which are afterwards discharged from the working chamber, in which the compression chamber is moved outside the working chamber and in relation to this chamber from the moment when compression of the combustible mixture ends through the discharge of combustion materials into the working chamber. The said problem is also solved in a rotary internal-combustion engine comprised of a housing closed with lids and provided with intake and exhaust ports, wherein rotors are mounted in the housing and are gasketed against the walls of the housing, its lids and between each other, thus forming with them operational and compression chambers, the rotors being mounted to move the compression chamber outside the working chamber and in relation to this chamber, the working chamber having a screen separating the intake port from the exhaust port. Furthermore, the rotary internal-combustion engine may have several combustion chambers for one working chamber, as well as several working chambers for one combustion chamber. At the same time, the compression chambers may be made connectable with each other. The working chambers may be also formed connectable with each other.

Due to these features of the method of operation of a rotary engine and the rotary internal-combustion engine of the invention, in particular due to moving the compression chamber outside the working chamber and in relation to this chamber by the rotors, one may achieve more efficient application of active forces (due to the pressure from combustion materials within the combustible mixture) to a rotor mounted on an engine shaft.

EMBODIMENTS

Figure 1:
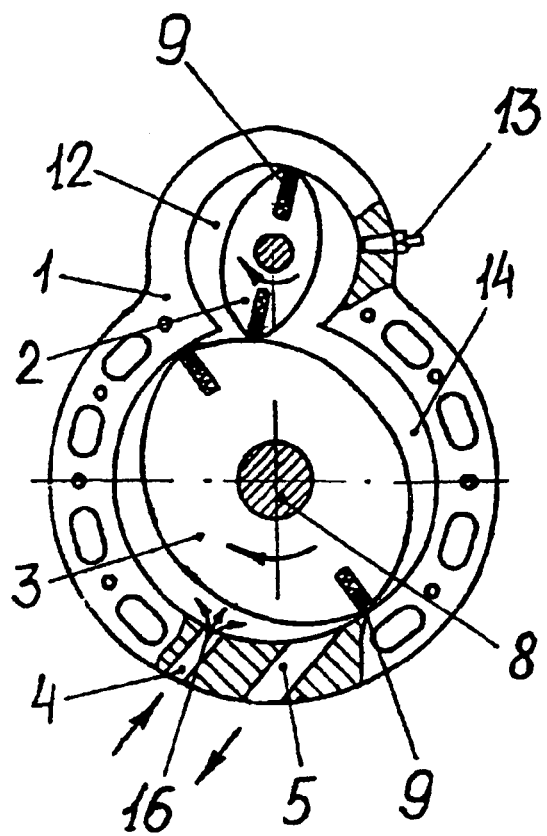
FIG. 1 and FIG. 2 show a cross-section of the engine according to the invention.
Figure 2:
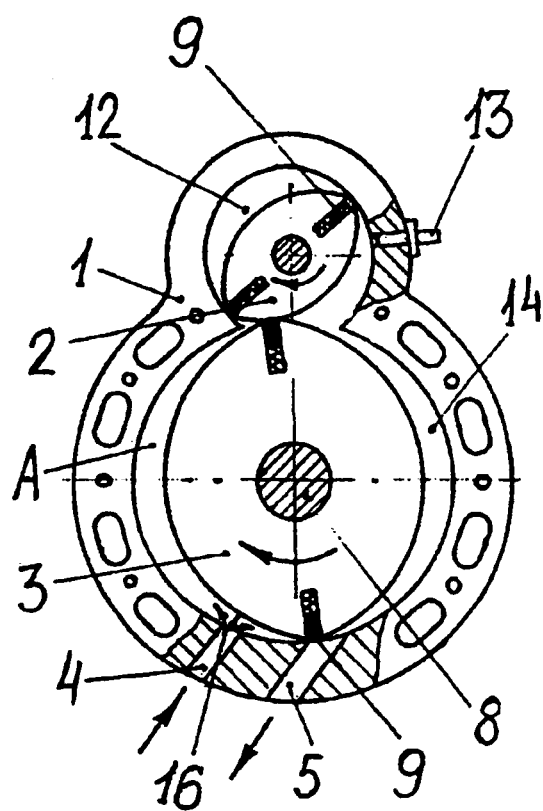
Figure 3:
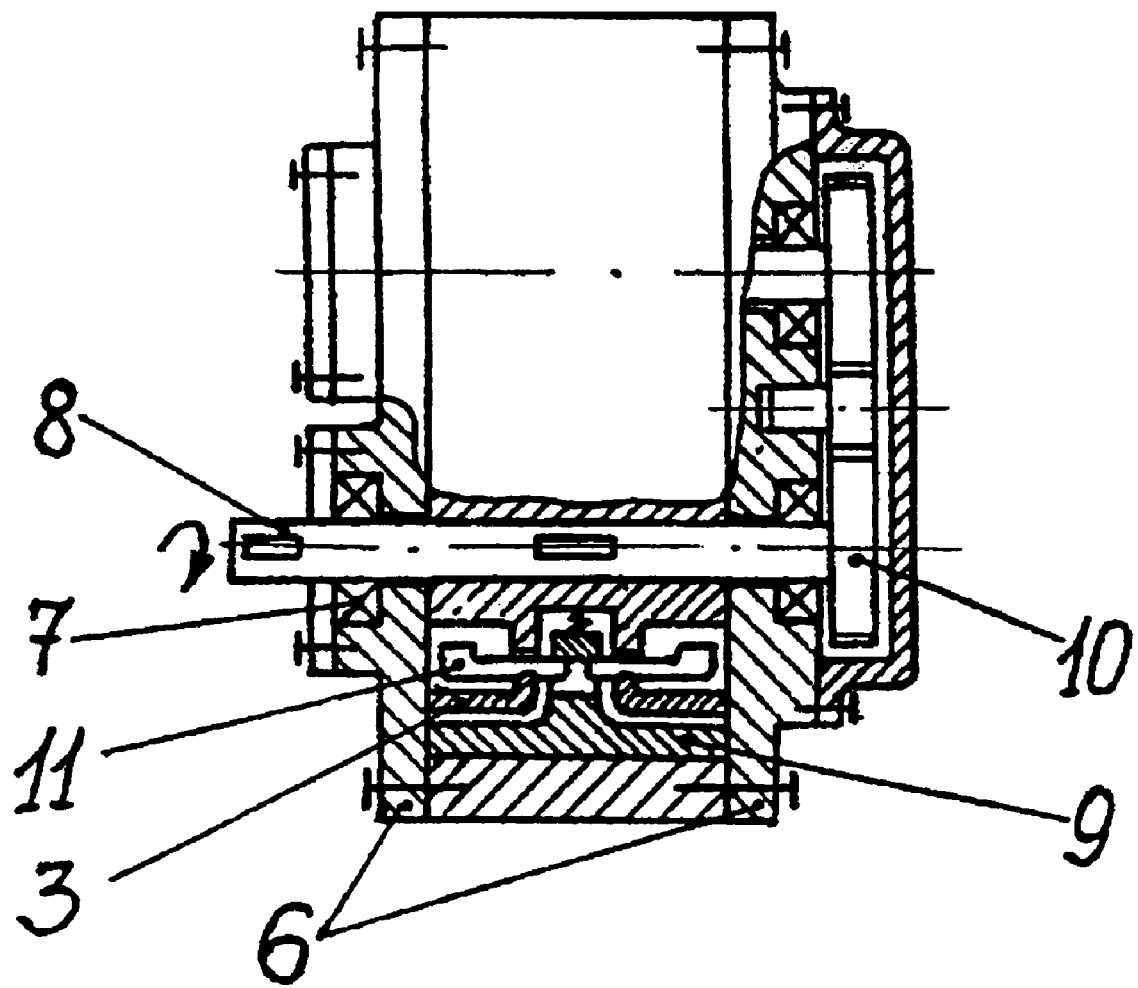
FIG. 3 shows a longitudinal section of the engine.
Figure 4:
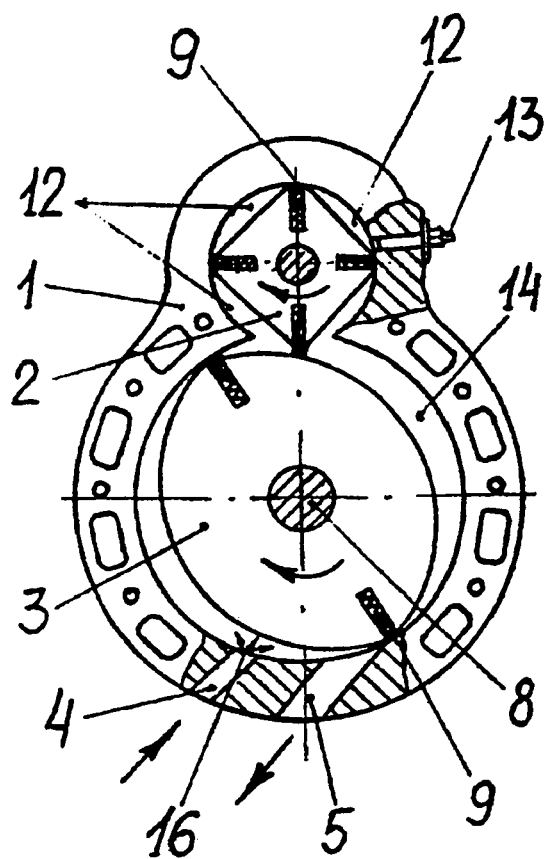
FIG. 4 shows a cross-section of the engine with two compression chambers for one working chamber.
Figure 5:
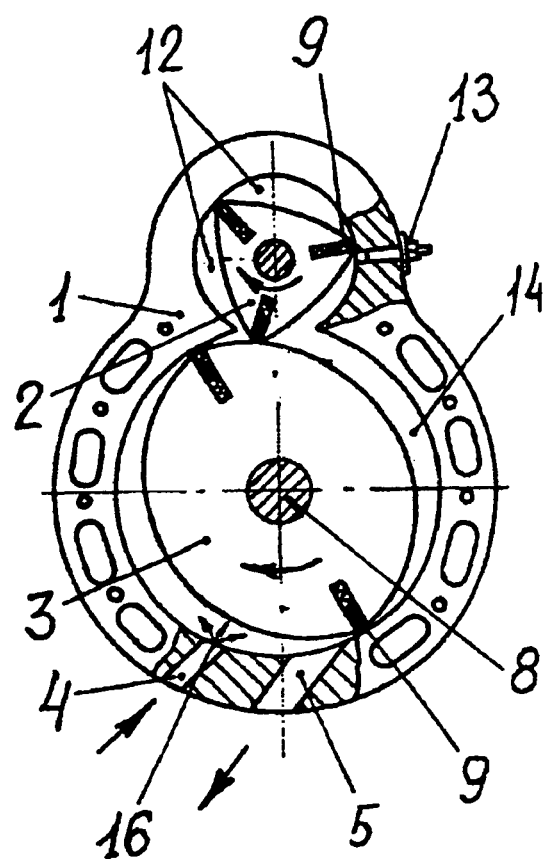
FIG. 5 shows a cross-section of the engine having three compression chambers for one working chamber and two working chambers for one compression chamber.
Figure 6:
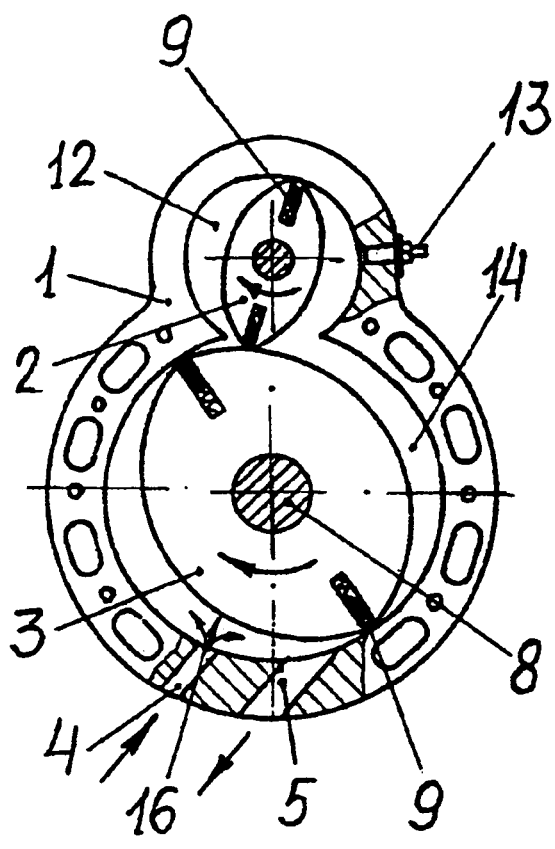
FIG. 6 shows a cross-section of the engine with a non-cylindrical chamber of the housing which accommodates a rotor with sliding blades moving reciprocally in the slots of the rotor upon its movement.
Figure 7:
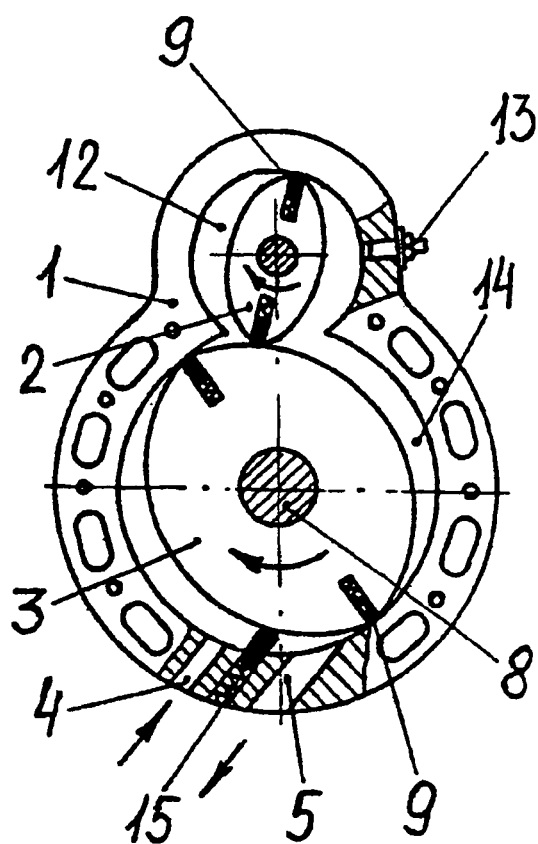
FIG. 7 shows a cross-section of the engine having the screen in the form of a spring-loaded plate.
Figure 8:
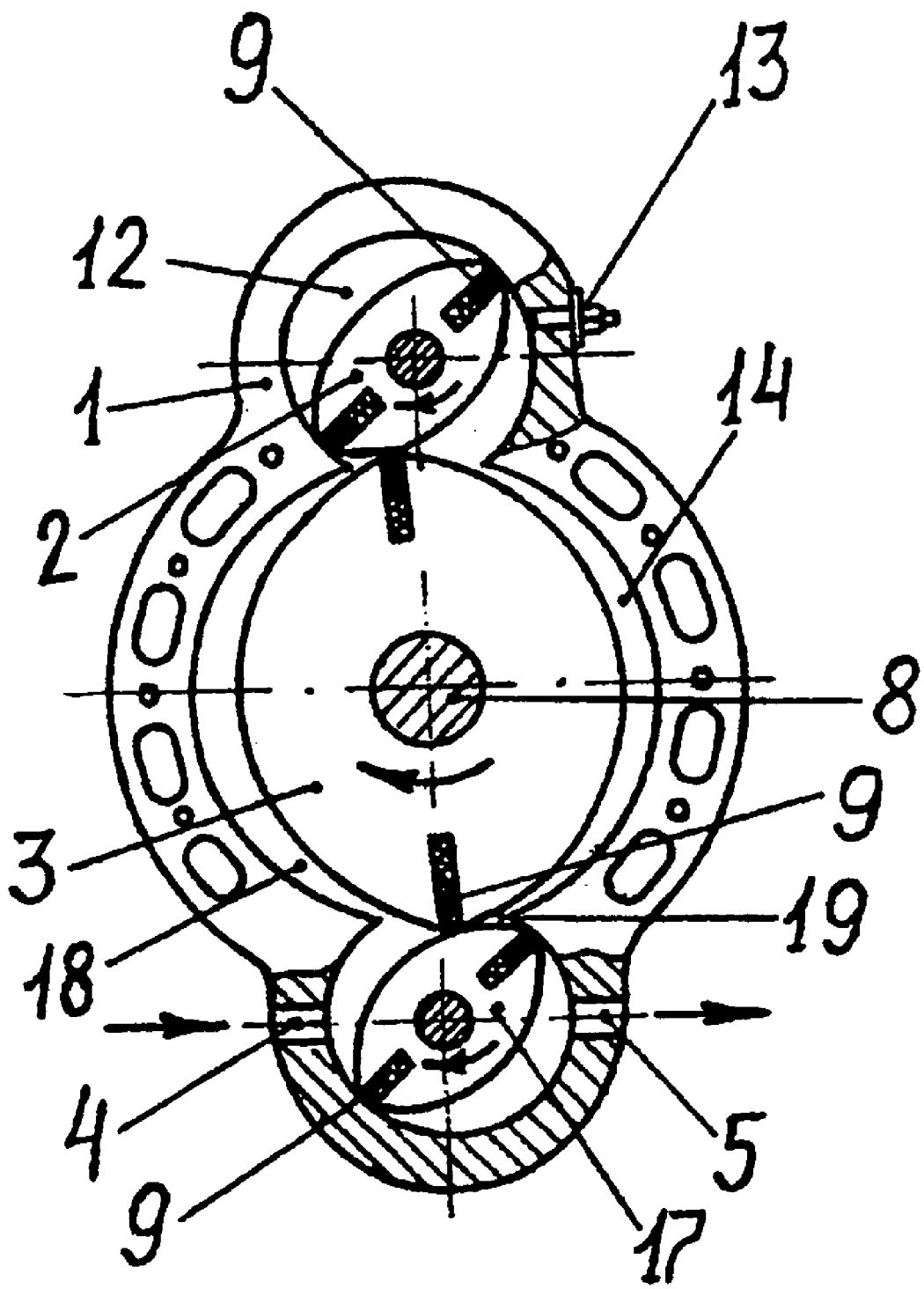
FIG. 8 shows a cross-section of the engine with the screen in the form of an additional rotor forming an additional compression chamber connectable to the adjacent main compression chamber and an additional working chamber connectable to the adjacent main working chamber.

The rotary internal-combustion engine according to the invention comprises a housing 1 where rotors 2 and 3 are mounted in its chambers. The housing is provided with an intake port 4 and an exhaust port 5. The housing of the engine is also closed with lids 6 on which bearings 7 of the rotors are mounted co-axially with the chambers of the housing. The rotor 3 is connected with the working shaft 8 of the engine. The rotors comprise spring-loaded blades 9 and are connected with each other through the transmission 10 (for example, gear-type transmission) providing interrelated rotation of the rotors. The blades 9 may be equipped with the counter-loads 11 (FIG. 3) in order to reduce their pressing toward the housing of the engine by centrifugal forces during the operation of the engine. The compression chamber 12 holds a fuel injector or igniter plug 13. The screen may be made as a spring-loaded plate 15 (FIG. 7), as a gaseous (air) barrier 16 (FIGS. 1, 2, 4, 5, 6 in engines with pressurisation) or as an additional rotor 17 (FIG. 8). The spring-loaded blades 9 serve as gaskets between the rotors, housing and lids of the engine. These blades can not perform reciprocal movement in slots of rotors rotating within cylindrical chambers of engine housing (FIGS. 1, 2, 4, 5, 7, 8).

However, the blades 9 can move reciprocally in slots of the rotors when the latter rotate in non-cylindrical chambers of the housing (FIG. 6), which provides increased degree of compression, increased capacity and torque as compared with an engine in which blades can not move reciprocally. The structures of the engine according to the invention may be provided with one (FIGS. 1, 2, 6, 7, 8) and several compression chambers (FIGS. 4, 5) for one working chamber. The engine (FIG. 8) may also have an additional compression chamber 18 (formed by the additional rotor 17) and a working chamber 19, with the compression chamber 18 being connectable to the compression chamber 12, and the working chamber 19 being connectable to the working chamber 14. Such design of the engine (FIG. 8) allows an increase in the degree of compression and in fuel-efficiency.

The engine is also provided with a fuel system, ignition system, lubricating system, cooling system and gaseous distribution system.

The operation of the engine is described below.

On start-up, the rotors 2 and 3 start rotating thus forming and moving the compression chamber 12 and the working chamber 14. Components of combustible mixture are injected in chamber A (with its volume being increased, FIG. 2) through the intake port 4 and further compressed to the volume of the compression chamber 12. Afterwards the chamber 12 moves outside the working chamber 14 and in relation to this chamber, and ignition takes place in this chamber (in advance, if necessary), and the combustible mixture combusts yielding combustion materials which are further directed in the working chamber 14 and which rotate the rotor 3 connected to the working shaft 8. In the engine shown on FIG. 8, components of combustible mixture are first injected and compressed in the compression chamber 18 and are then ejected to the compression chamber 12. Combustion materials are directed from the working chamber 14 to the working chamber 19, where they rotate the rotor 3 with the working shaft 8 of the engine, with their subsequent discharge combustion from the engine through the exhaust port 5.

The four-stroke operational cycle of the rotary engine is repeated.

The use of the present invention allows to make the engine more cost-effective and ecologically compatible, increase rotation frequency of the working shaft of this engine due to providing advance ignition, which does not cause negative torque in the engine, and to reduce vibration of the engine due to placing its rotors co-axially with chambers in the housing where they are mounted, as well as to make the manufacture of such an engine more cost-effective due to the simplicity of its design.

The invention claimed is:

1. A rotary internal-combustion engine wherein the housing, comprised of lids, an intake port and exhaust port, holds an operational rotor and compression rotor gasketed against the walls of the housing, the lids and between each other, thus forming with them operational and compression chambers, and wherein the rotors are configured so that the operational rotor is oval-shaped when viewed in cross-section, whilst the compression rotor is square-shaped when viewed in cross-section.

* * * * *